United States Patent [19]

Lee

[11] Patent Number: 5,389,970

[45] Date of Patent: Feb. 14, 1995

[54] METHOD AND CIRCUIT FOR CONTROLLING WHITE BALANCE IN A VIDEO SIGNAL

[75] Inventor: Seung E. Lee, Seoul, Rep. of Korea

[73] Assignee: Goldstar Co., Ltd., Rep. of Korea

[21] Appl. No.: 81,882

[22] Filed: Jun. 25, 1993

[30] Foreign Application Priority Data

Jun. 26, 1992 [KR] Rep. of Korea .................. 11226

[51] Int. Cl.$^6$ ......................................... H04N 9/73
[52] U.S. Cl. .............................. 348/228; 348/655
[58] Field of Search ............... 358/29, 21 R, 29 C; H04N 9/64, 9/73; 348/223, 225, 228, 655

[56] References Cited

U.S. PATENT DOCUMENTS

| | | | |
|---|---|---|---|
| 4,727,413 | 2/1988 | Miura et al. | 358/29 |
| 4,883,360 | 11/1989 | Kawada et al. | 356/402 X |
| 5,099,316 | 3/1992 | Ogawa | 358/41 X |
| 5,170,247 | 12/1992 | Takagi et al. | 358/29 |
| 5,177,599 | 1/1993 | Takagi et al. | 358/29 |
| 5,223,921 | 6/1993 | Haruki et al. | 358/29 |

FOREIGN PATENT DOCUMENTS

| | | | |
|---|---|---|---|
| 0433672 | 6/1991 | European Pat. Off. | H04N 9/73 |
| 0075693 | 4/1986 | Japan | H04N 9/73 |
| 0005286 | 1/1989 | Japan | H04N 9/73 |
| 0090693 | 4/1989 | Japan | H04N 9/73 |
| 1-112887 | 5/1989 | Japan | H04N 9/73 |
| 0226892 | 9/1990 | Japan | H04N 9/73 |

*Primary Examiner*—James J. Groody
*Assistant Examiner*—John W. Miller
*Attorney, Agent, or Firm*—Morgan & Finnegan

[57] ABSTRACT

A circuit for controlling white balance in a video signal comprising separators for separating a luminance signal, a red signal and a blue signal from the video signal, gain control amplifiers for amplifying the separated red signal and the separated blue signal, substractors for making a red minus luminance signal and a blue minus luminance signal from the luminance signal, the amplified red signal and the amplified blue signal, integrators for integrating the luminance signal, the red minus luminance signal and the blue minus luminance signal, switching circuit, coupled between the substractors and the integrators, for switching outputs of the substractors to supply the luminance signal, the red minus luminance signal and the blue minus luminance signal having only levels under predetermined levels to the integrators, and microcomputer for determining whether the outputs of the integrators belong to a certain white area, to control gains of said gain cortrol amplifiers when the ouput of the integrators belong to the certain of white area.

9 Claims, 4 Drawing Sheets

METHOD AND CIRCUIT FOR CONTROLLING WHITE BALANCE IN A VIDEO SIGNAL

FIELD OF THE INVENTION

This invention relates to a video signal processing technique, and more particularly to a white balance controlling method and a circuit thereof to improve color reproductivity.

Recently, the developments of technologies such as miniaturization, light weight, high magnification zoom and reproduction of natural color became more active to satisfy consumers increasing demand more sophisticated for cameras and camera-recorders. The reproductivity of the natural color can be improved by means of appropriate control of white balance.

FIG. 1 shows a conventional white balance controlling circuit.

BACKGROUND OF THE INVENTION

An amplifier 1 amplifies a video signal Vi of an object tramsmitted from a charge coupled device(CCD) (not shown). Separators 2,3,4 separate the video signal into a luminance signal(Y signal), a red signal(R signal), a blue signal(B signal) respectively. Gain Control amplifiers 5,6 amplify the separated R signal and the separated B signal respectively. Substractors 7,8 substract the Y signal from the R signal from and the B signal respectively generate an R-Y signal and a B-Y signal respectively. An encoder 9 generates an encoded signal E1 according to the R-Y signal and the B-Y signal. A mixer 10 mixes the Y signal and the encoded signal E1 to generate a mixed signal Vout.

On the other hand, integrators 11, 12 integrate the R-Y signal and the B-Y signal transmitted from the substractors 7,8 respectively to generate smoothened signals S1, S2 respectively. Comparators 13, 14 compare the smoothened signals S1, S2 with predetermined reference voltages Vr1, Vr2 respectively to control the gains of the gain control amplifiers 5,6 respectively. These are performed in real time. Accordingly, the white balance of the mixed signal Vout generated in the mixer 10 is controlled.

However, the conventional white balance controlling circuit has such a problem that it reproduces colors quite different with the natural color as the conventional circuit tends to shift to white when the image signal is monochromic or most of the region of the image signal is monochromatic, and also when the level of the luminance is high.

SUMMARY OF THE INVENTION

An object of this invention is to provide a white balance controlling method and a circuit thereof which can distinguish white area in a video signal.

Another object of this invention is to provided the white balance controlling method and the circuit thereof which can permit white balancing only on the white area.

These and other object of this invention can be achieved by providing a circuit for controlling white balance in a video signal comprising separators for separating a luminance signal, a red signal and a blue signal from the video signal, gain control amplifiers for amplifying the separated red signal and the separated blue signal, substractors for making a red minus luminance signal and a blue minus luminance signal from the luminance signal, the amplified red signal and the amplified blue signal, integrators for integrating the luminance signal, the red minus luminance signal and the blue minus luminance signal, switching circuit, coupled between the substractors and the integrators, for switching outputs of the substractors to supply the luminance signal, the red minus luminance signal and the blue minus luminance signal having only levels under predetermined levels to the integrators, and microcomputer for determining whether the outputs of the integrators belong to a certain area of the white area, to control gains of said gain control amplifiers when the ouput of the integrators belong to the certain area of the white area, and further achieved by providing a method for controlling white balance in the video signal comprising the steps of resetting the integrating means during a predetermined period, setting the integrating means during another predetermined period, computing the integrated values of the signals having only a level of the under the predetermined levels, determining whether the computed value belongs to a white area, and controlling amplification gains of the red signal and the blue signal.

According to this invention, the white balance is controlled only when the level of a integrated signal excluding high luminance signal and monochromatic signal falls on the white area.

DETAILED DESCRIPTION OF THE INVENTION

Figure 1:
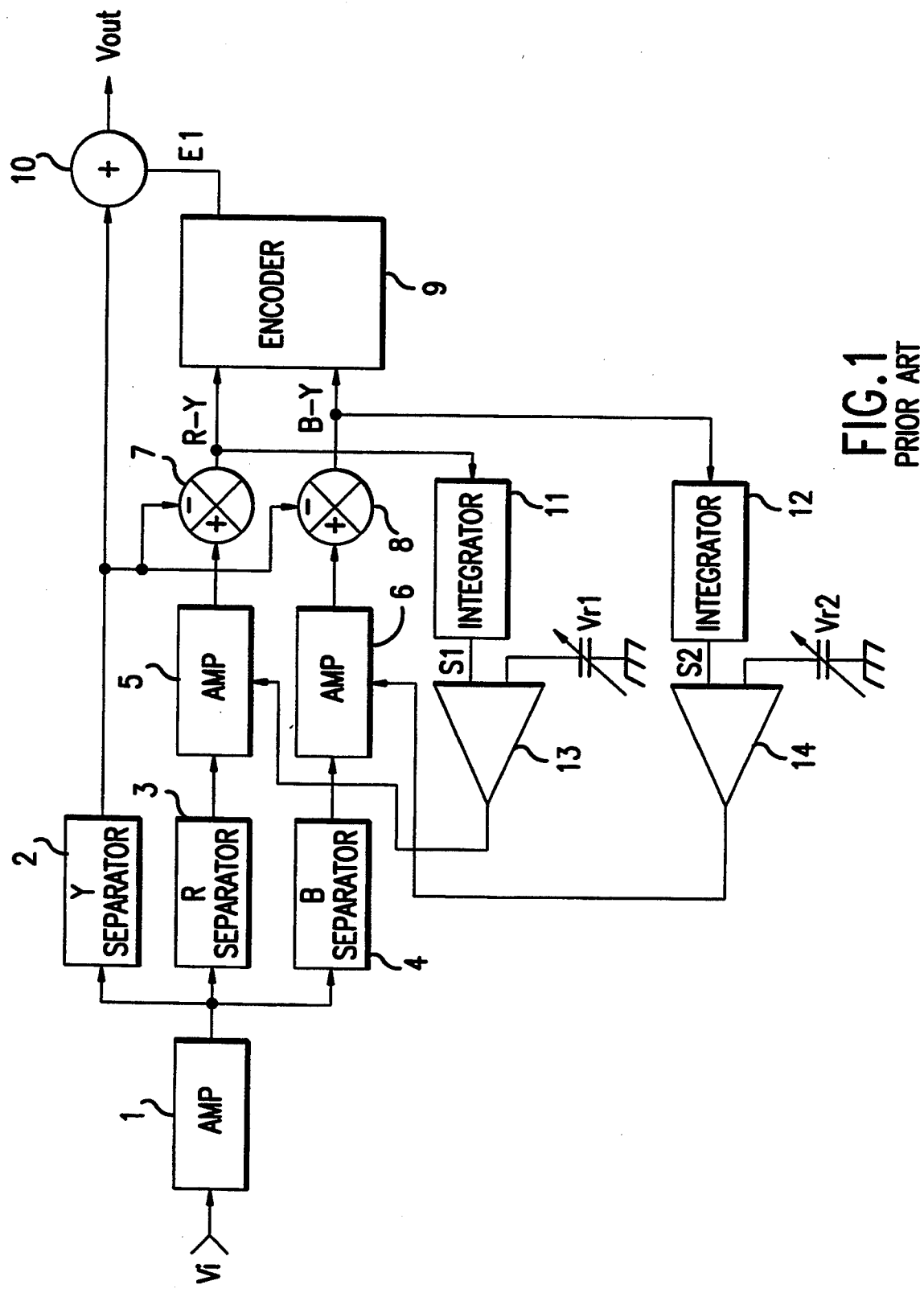
FIG. 1 shows a conventional white balance controlling circuit.
Figure 2:
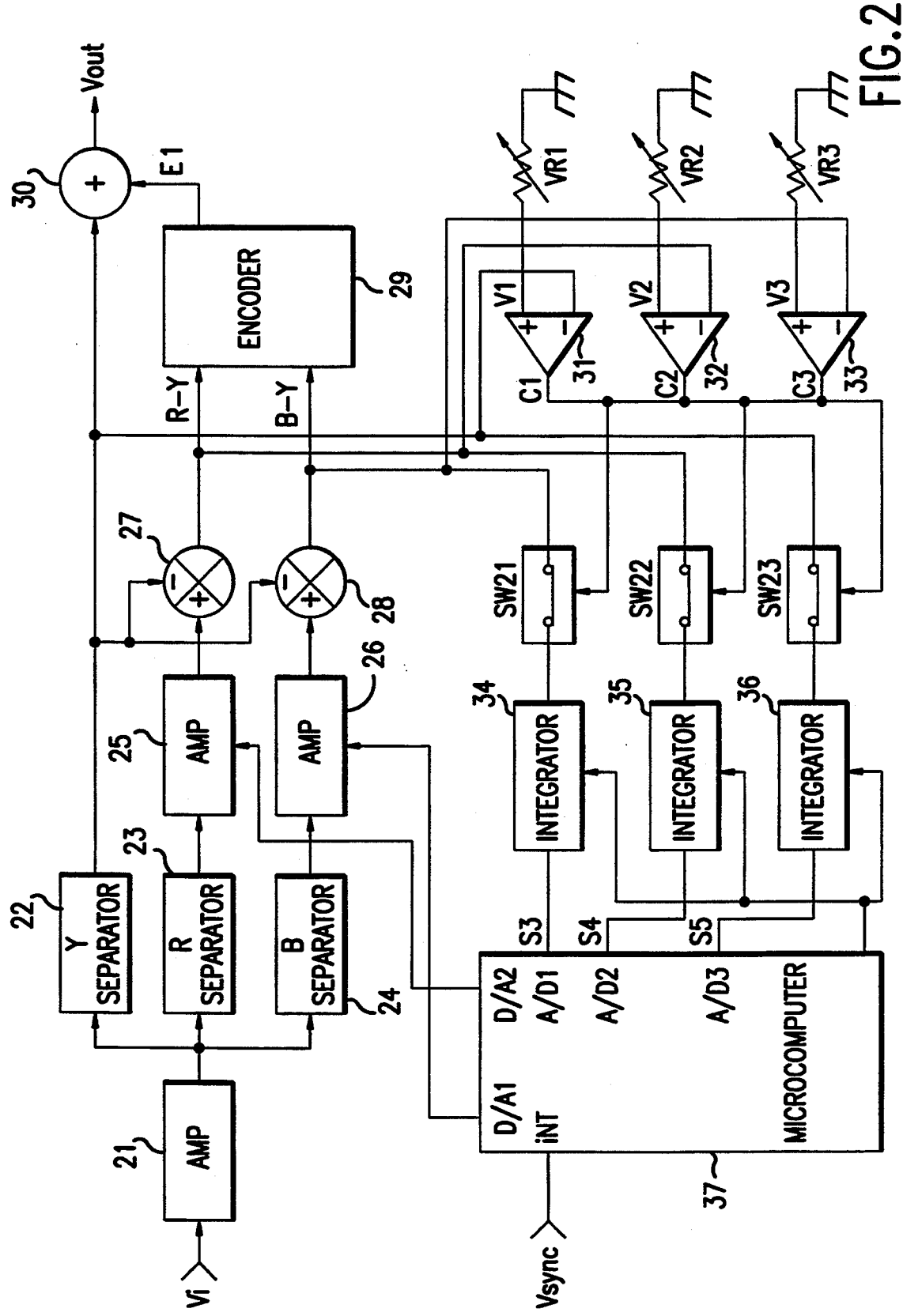
FIG. 2 shows a white balance controlling circuit according to an embodiment of this invention.

FIG. 2 is one preferred embodiment of this invention showing a white balance adjustment circuit including an amplifier 21, separators 22, 23, 24, gain control amplifiers 25, 26, substractors 27, 28, an encoder 29, an mixer 30, comparators 31, 32, 33, switches SW1, SW2, SW3, integrators 34, 35, 36 and a microcomputer 37. VR1, VR2 and VR3 are variable resistors.

The amplifier 21 amplifies a video signal Vi of an object transmitted from a charge coupled device(not shown). The separators 22, 23, 24 separate a Y signal, an R signal and a B signal from the amplified video signal, respectively. Gain control amplifiers 25, 26 amplify the sepatrated R signal and the separated B signal, respectively. The substractors 27, 28 substract the Y signal from the amplified R signal and the amplified B signal to generate R-Y signal and B-Y signal, respectively. The encoder 29 generates a predetermined encoded signal E1 according to the R-Y signal and the B-Y signal. The mixer 30 generates a mixed signal Vout of the Y signal and the encoded signal E1.

The comparators 31, 32, 33 generate compared signals C1, C2, C3 respectively by comparing the Y signal transmitted from the separator 22 and the R-Y signal and the B-Y signal transmitted from the substractors 27, 28 respectively with reference voltages V1, V2, V3 set by the variable resistors VR1, VR2, VR3, respectively.

The reference voltages V1, V2, V3 may be appropriately set by varying the resistances of the variable resistors VR1, VR2, VR3.

Figure 3:
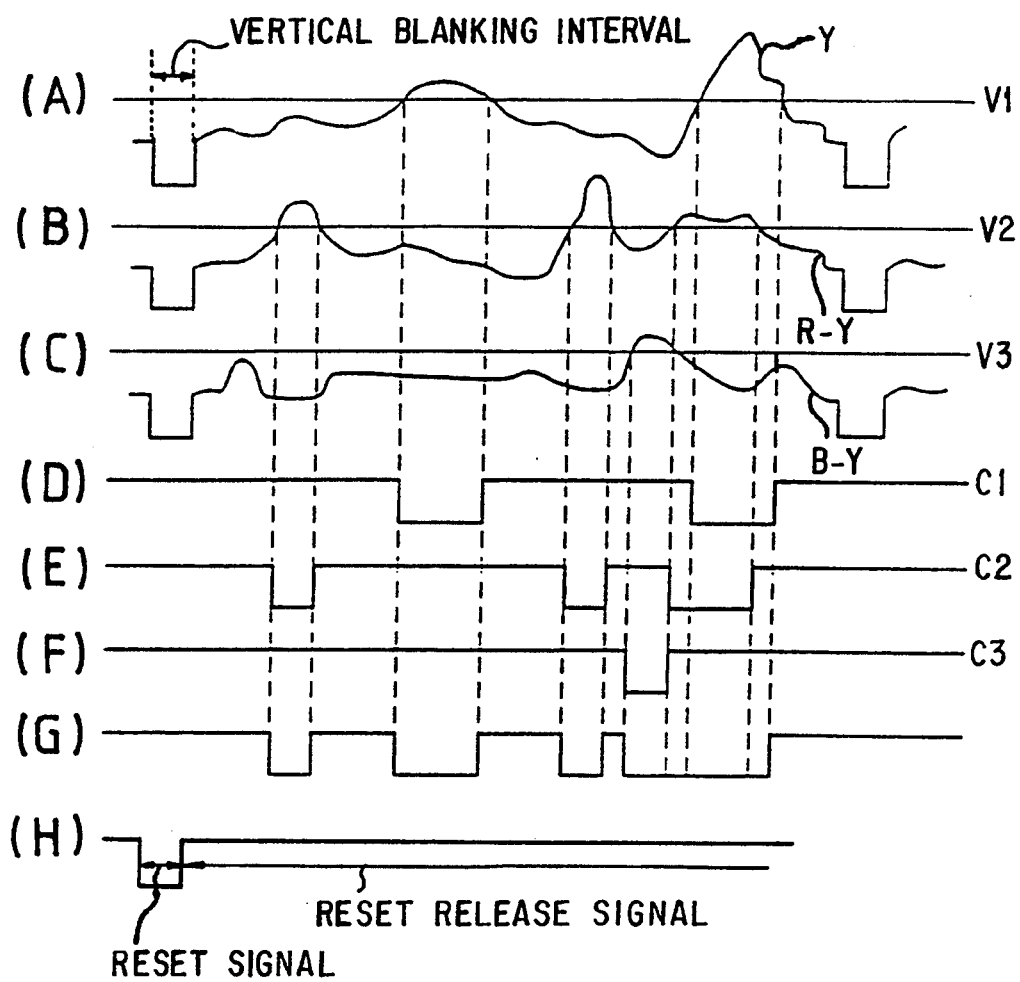
FIG. 3 shows wave patterns for explaining the operation of FIG. 2.

When the Y signal, the R-Y signal and the B-Y signal have wave patterns as shown in FIGS. 3(A), 3(B), 3(C), respectively, the comparators 31, 32, 33 generate pulse signals as shown in FIGS. 3(D), 3(E), 3(F). The compared signals C1, C2, C3, after being mixed as shown in FIG. 3(G), are transmitted to the control terminals of the switches SW1, SW2, SW3, respectively. The switches SW1, SW2, SW3 are turned off in periods which the level of the Y signal is higher than the reference voltage V1, the level of the B-Y signal is higher than the reference voltage V2, or the level of the R-Y signal is higher than the reference voltage V3. Thus, according to the switching operations of the switches SW1, SW2, SW3, the white balance controlling is performed only on the video signal excluding high luminance signal and monochromatic signal. The integrators 34, 35, 36 integrate the B-Y signal, the R-Y signal and the Y signal according to the switching operation of the switches SW1, SW2, SW3 to generate smoothened signals S3, S4, S5.

Figure 4:
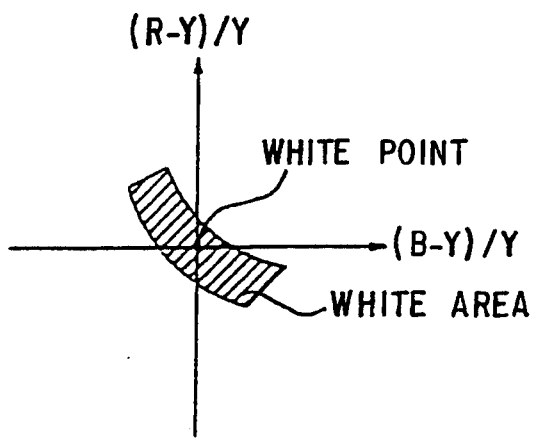
FIG. 4 is a graph showing a white point and white area determined in accordance with this invention.
Figure 5:
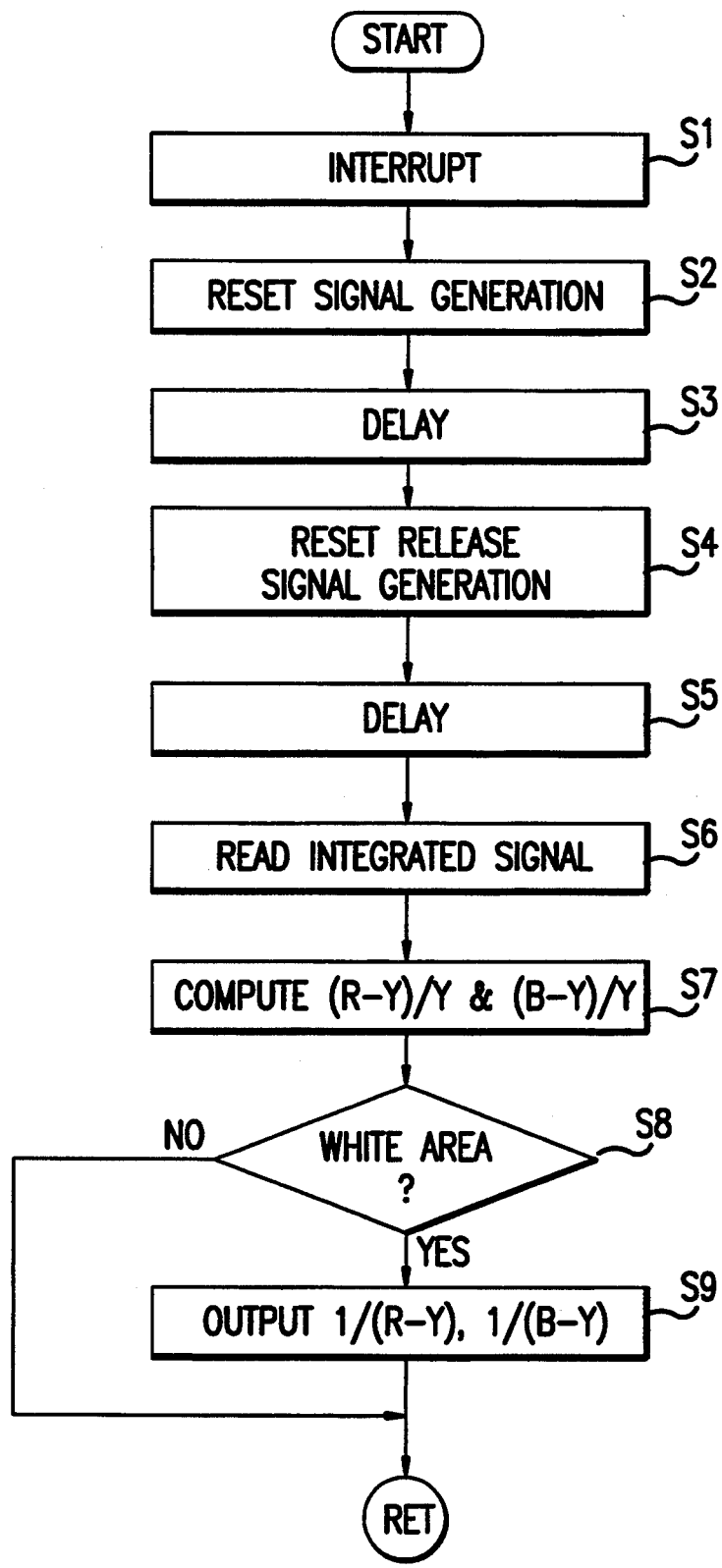
FIG. 5 is a flow chart describing a white balance controlling method according this invention.

Shown in FIG. 4 is a graph showing a white point and white area obtained through theory and tests. The white point and the white area are stored in the microcomputer 37. For varying the white point and white area, $E^2$ PROM(electrically erasable programmable read only memory) is used. The operation of microcomputer 37 is explained hereinafter referring to FIG. 5.

When a vertical synchronizing signal Vsync in a video signal is transmitted to a interrupt terminal INT (step S1), the microcomputer 37 generates the reset signal(FIG. 3(H) wave pattern) for resetting the integrators 34, 35, 36 from a reset terminal RST(step S2).

The reset signal is delayed during the time when there is no image signal such as a vertical blanking interval(about 20.5H, where H is a horizontal synchronizing interval)(step S3). After the vertical blanking interval is over(step S4), a reset release signal is generated from the reset terminal RST in the microcomputer 37 and the reset release signal is maintained when there is an image signal(about 220H) (step S5). The integrators 34, 35, 36 integrate one field of the B-Y signal, the R-Y signal and the Y signal and produce the smoothened signals S3, S4, S5, respectively, in response to the reset release signal. The smoothened signals S3, S4, S5 are the signals excluding the high luminance signal and the monochromatic signal according to the swiching operation of the switches SW1, SW2, SW3. The microcomputer 37 reads in the smoothened signals S3, S4, S5 through input ports A/D1, A/D2, A/D3, respectively (step S6) and compute a (R-Y)/Y signal and a (B-Y)/Y signal (step S7). The microcomputer 37 determines whether the (R-Y)/Y signal and the (B-Y)/Y signal fall on the white area of FIG. 4 stored in the E PROM (step S8), and transmits 1/(R-Y) and 1/(B-Y) through output ports D/A1, D/A2 to the gain contral amplifiers 25, 26, respectively, when the signals fall on the white area, so that enter to the white point. Thus, the white balance of the mixed signal Vout genenated from the mixer 30 is controlled automatically. The use of commercial one chip microcontroller which contains A/D ports and D/A ports allows no cost increase of the hardware of this new product.

As described above, according to this invention, it is possible to control the white balance when the video signal falls on the substantial white area and to control the white balance on the video signal excluding the high luminance signal and the monochromatic signal, so that the reproduction of natural color can be achieved almost perfectly.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A circuit for controlling white balance in a video signal having a predetermined white area, comprising:
   means for separating a luminance signal, a red signal and a blue signal from the video signal;
   gain control amplifier means for amplifying the separated red signal and the separated blue signal received from said means for separating and outputting amplified red and blue signals;
   making means for making a red minus luminance signal and a blue minus luminance signal from the luminance signal received from said means for separating, and the amplified red signal and the amplified blue signal received from said gain control amplifier means;
   integrating means for integrating the luminance signal, the red minus luminance signal and the blue minus luminance signal;
   means, coupled between said making means and said integrating means, for controlling said making means to supply the luminance signal, the red minus luminance signal and the blue minus luminance signal having levels under first, second and third predetermined signal levels respectively, to said integrating means; and
   a microcomputer connected to said integrating means and determining whether the integrated luminance, red minus and blue minus luminance signals received from said integrating means fall within a predetermined white area indicating that the integrated luminance, red minus and blue minus luminance signals are used to control the white balance, and said microcomputer having a memory storing the predetermined white area.

2. A circuit according to claim 1, wherein said switching means including means for producing reference voltages, means for comparing the reference voltages with the luminance signal, the red minus luminance signal and the blue minus luminance signal, means for mixing the outputs of said comparing means, and switches for switching the outputs of said making means in accordance with the mixed signal.

3. A circuit according to claim 1, wherein the memory in said microcomputer is an electrically erasable programmable read only memory for storing the white region.

4. A circuit according to claim 1, wherein said microcomputer produces a reset signal for resetting said integrating means during a vertical blanking interval in response to a vertical synchronizing signal, and produces a reset release signal for setting said integrating means thereafter.

5. A circuit according to claim 1, wherein said microcomputer includes analog to digital converters for converting the outputs of said integrating means to digital signals and digital to analog converters for converting to analog signals so as to control said gain control amplifiers.

6. A circuit according to claim 1,
wherein said microcomputer divides the integrated luminance, red minus and blue minus luminance signals by the luminance signal forming first, second and third divided signals, and
wherein said microcomputer determines whether the first, second and third divided signals fall within the predetermined white area for controlling the white balance.

7. In a circuit for controlling white balance in a video signal having means for integrating a luminance signal, a red minus luminance signal and a blue minus luminance signal, and means for switching outputs to supply the luminance signal, the red minus luminance signal and the blue minus luminance signal having signal levels under predetermined levels to said integrating means, a method for controlling white balance in the video signal comprising the steps of:

resetting said integrating means during a predetermined period;
setting said integrating means during another predetermined period;
computing the integrated values of the signals having the signal levels under the predetermined levels;
determining whether the computed value belongs to a white area; and
controlling amplification gains of the red signal and the blue signal.

8. A method according to claim 7, wherein the predetermined period is a vertical blanking interval.

9. A method according to claim 7, wherein the another predetermined period is one field period of the video signal.

* * * * *